United States Patent
Chang

(10) Patent No.: US 10,139,886 B2
(45) Date of Patent: Nov. 27, 2018

(54) INPUT MODULE

(71) Applicant: PRIMAX ELECTRONICS LTD., Taipei (TW)

(72) Inventor: Pei-Ming Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 211 days.

(21) Appl. No.: 15/202,454

(22) Filed: Jul. 5, 2016

(65) Prior Publication Data

US 2017/0300136 A1    Oct. 19, 2017

(30) Foreign Application Priority Data

Apr. 15, 2016  (TW) .............................. 105111872 A

(51) Int. Cl.

| | |
|---|---|
| *G06F 3/0354* | (2013.01) |
| *G06F 1/32* | (2006.01) |
| *G06F 3/00* | (2006.01) |
| *G06F 3/033* | (2013.01) |
| *G06F 3/038* | (2013.01) |

(52) U.S. Cl.
CPC .............. *G06F 1/3215* (2013.01); *G06F 1/32* (2013.01); *G06F 1/3206* (2013.01); *G06F 1/3259* (2013.01); *G06F 3/033* (2013.01); *G06F 3/038* (2013.01); *G06F 3/0354* (2013.01); *G06F 3/0383* (2013.01); *G06F 3/03543* (2013.01)

(58) Field of Classification Search
None
See application file for complete search history.

(56) References Cited

U.S. PATENT DOCUMENTS

| | | | | |
|---|---|---|---|---|
| 6,594,767 | B1 * | 7/2003 | Wiley .................... | G06F 1/3203 713/300 |
| 6,925,574 | B2 * | 8/2005 | Satoh ................. | H04N 1/00885 713/300 |
| 7,353,413 | B2 * | 4/2008 | Dunstan ................ | G06F 1/3203 713/310 |
| 9,354,688 | B2 * | 5/2016 | Furubayashi ......... | G06F 1/3209 |
| 9,501,128 | B2 * | 11/2016 | Alshinnawi ........... | G06F 1/3234 |
| 2005/0154934 | A1 * | 7/2005 | Kim ....................... | G06F 1/3203 713/323 |
| 2017/0300136 | A1 * | 10/2017 | Chang ................. | G06F 3/03543 |

* cited by examiner

*Primary Examiner* — Tanh Q Nguyen
(74) *Attorney, Agent, or Firm* — Kirton McConkie; Evan R. Witt

(57) ABSTRACT

An input module includes an input device and a control program. The input device is in communication with a computer. The control program is installed in the computer. If a control signal from a processing unit of the input device has not been received by the computer for a predetermined time period after the control program is opened, the control program issues a command signal to the processing unit. After the command signal is received by the processing unit, the processing unit issues at least one response signal to the computer so as to prevent the computer from entering a hibernation mode.

8 Claims, 1 Drawing Sheet

INPUT MODULE

FIELD OF THE INVENTION

The present invention relates to an input device, and more particularly to an input module for a computer.

BACKGROUND OF THE INVENTION

With increasing development of electronic and information industries, computers become essential tools in our daily lives. For example, computers can be used to process data in order to simplify and accelerate the work. Moreover, computers can be used to provide video entertainments. In addition, computers can be connected to the internet to acquire information.

Moreover, the modern computers are designed in views of the power-saving and environmental protection purposes. For example, after the computer has been idled for a predetermined time period, the computer enters a hibernation mode automatically in order to achieve power-saving efficacy. However, this power-saving method is not user-friendly. For example, in some scenarios, the user has to be away from the location of the computer and go back to the location of the computer after the predetermined time period. For operating the computer, the user has to wake up the computer from the hibernation mode by inputting a password for example. The repeat action of inputting the password to wake up the computer is troublesome to the user. Moreover, the computer in the production line testing system is usually used to provide test commands to the device under test and acquire the test results according to the feedback response of the device under test. If the test time is longer than the above-mentioned predetermined time period and the mouse and the keyboard of the computer are not operated within the test time, the computer will enter the hibernation mode automatically. Under this circumstance, the test procedure is interrupted.

Generally, two approaches are provided to solve the above drawbacks. In accordance with the first approach, the computer never enters the hibernation system according to the settings of the operation system (e.g., Windows) of the computer. However, this service is not provided by some computer operation system such as OSX 10.10.3 (Apple). In accordance with a second approach, a sensor is used to detect whether the user is near the location of the computer and determine whether the computer enters the hibernation mode according to the detecting result. That is, if the user is not in the sensing range of the sensor, the computer enters the hibernation mode. However, if the user is in the sensing range of the sensor but the user does not want to use the computer, the computer is still restored to the normal working mode. Under this circumstance, the power-saving efficacy cannot be achieved. Moreover, when the user wants to use a computer presentation program (e.g., Microsoft PowerPoint) to make a presentation for many persons, the user needs to frequently depart from the seat to make a report or explanation. In some other situations, the user has to temporarily depart from the seat. If the computer is switched to the standby state because the sensor detects that the user is not in the sensing range of the sensor, the user may feel troublesome. Moreover, the sensor has to be continuously turned on to achieve the desired function. Although the amount of the electric energy consumed by the sensor is low, the continuous power consumption does not meet the power-saving requirements.

Therefore, there is a need of providing an input module for switching the operation mode of the computer between a hibernation mode and a normal working mode in a humanized manner.

SUMMARY OF THE INVENTION

An object of the present invention provides an input module for switching the operation mode of the computer between a hibernation mode and a normal working mode in a humanized manner according to the user's settings.

In accordance with an aspect of the present invention, there is provided an input module. The input module includes an input device and a control program. The input device is in communication with a computer and includes a processing unit. When the input device is operated by a user, the processing unit issues a control signal to the computer, so that the computer executes a command corresponding to the control signal. The control program is installed in the computer. If the control signal from the processing unit has not been received by the computer for a predetermined time period after the control program is opened, the control program issues a command signal to the processing unit. After the command signal is received by the processing unit, the processing unit issues at least one response signal to the computer so as to prevent the computer from entering a hibernation mode.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
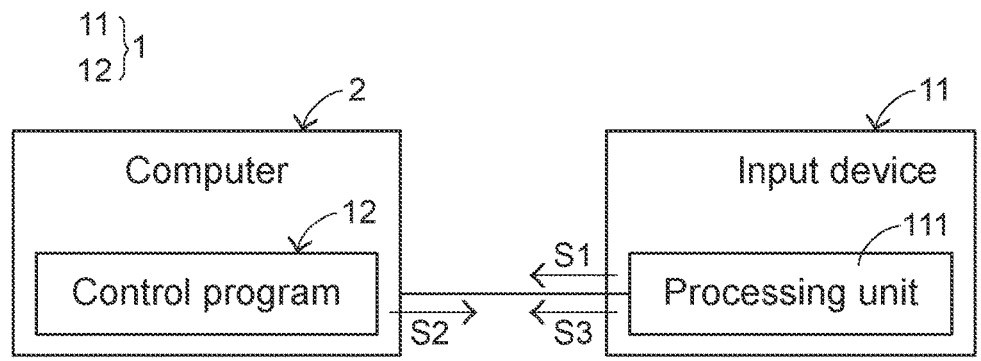
FIG. 1 is a schematic functional block diagram illustrating the connection between an input module and a computer according to an embodiment of the present invention.

FIG. 1 is a schematic functional block diagram illustrating the connection between an input module and a computer according to an embodiment of the present invention. As shown in FIG. 1, the input module 1 comprises an input device 11 and a control program 12. The input device 11 is in communication with the computer 2. The control program 12 is installed in the computer 2. The input device 11 comprises a processing unit 111. When the input device 11 is operated by the user, the processing unit 111 issues a control signal S1 to the computer 2. Consequently, a command corresponding to the control signal S1 is executed by the computer 2. Moreover, the input device 11 is in communication with the computer 2 in a wired connection manner (e.g., through a universal serial bus (USB) interface or a PS/2 interface) or a wireless connection manner (e.g., through a Wi-Fi interface or a Bluetooth interface).

After the control program 12 installed in the computer 2 is opened, the control program 12 detects whether the control signal S1 from the processing unit 111 of the input device 11 is received by the computer 2. If the control signal S1 from the processing unit 111 of the input device 11 has not been received by the computer 2 for a predetermined time period, the control program 12 issues a command signal S2 to the processing unit 111 of the input device 11. After the command signal S2 is received by the processing unit 111 of the input device 11, the processing unit 111 of the input device 11 issues at least one response signal S3 to the computer 2. According to the response signal S3, the computer 2 does not enter the hibernation mode. The operations of the input module will be described in more details later. Moreover, the predetermined time period is shorter than the idle time of the computer 2 to enter the hibernation mode. Moreover, according to the practical requirements, the response signal S3 is set to be identical to the control signal S1 or different from the control signal S1.

In an embodiment, the control program 12 is opened in response to a first specified operation of the user, and the control program 12 is closed in response to a second specified operation of the user. Preferably but not exclusively, the control program 12 provides a user operation interface 121 (see FIG. 2). According to the practical requirements, the first specified operation of opening the control program 12, the second specified operation of closing the control program 12 and the predetermined time period about the timing of allowing the control program 12 to output the command signal S2 can be set by the user though the user operation interface 121.

Figure 2:
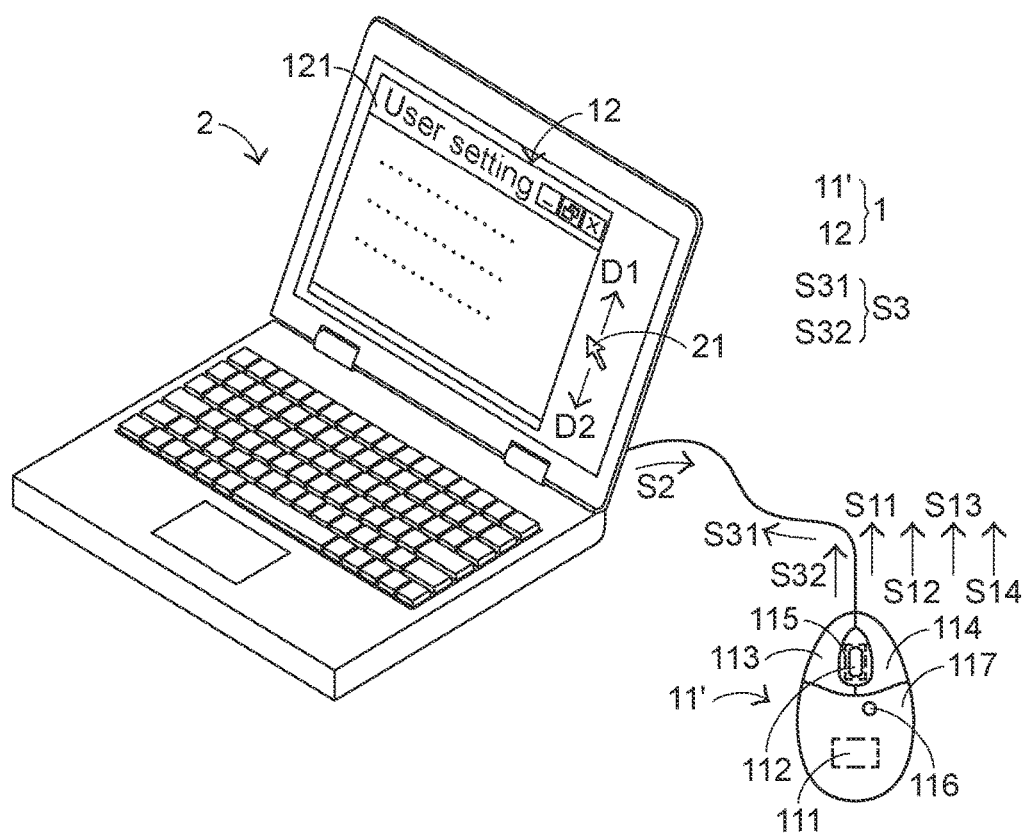
FIG. 2 schematically illustrates the use of a mouse device as the input device of the input module according to an embodiment of the present invention.

A method of using a mouse device as the input module to prevent the computer from entering the hibernation mode will be used as follows. FIG. 2 schematically illustrates the use of a mouse device as the input device of the input module according to an embodiment of the present invention. In this embodiment, the input device 11' is a mouse device. The processing unit 111 is disposed within a casing 117 of the mouse device. In addition, the mouse device further comprises a scroll wheel 112, a left button 113, a right button 114, an intermediate button 115 and a light-emitting element 116. The scroll wheel 112, the left button 113 and the right button 114 can be operated by the user. The intermediate button 115 is disposed under the scroll wheel 112. While input device 11' is held by the user's palm and the input device 11' is moved, the processing unit 111 issues a control signal S11. The control signal S11 is a trajectory moving signal. According to the control signal S11, the computer 2 executes a corresponding command such as the command of moving a mouse cursor 21. When the user clicks the left button 113 or the right button 114 or the user presses the scroll wheel 112 to trigger the intermediate button 115, the processing unit 111 issues a control signal S12. According to the control signal S12, the computer 2 executes a corresponding command such as the click command or a menu-showing command. The ways of generating the control commands are well known to those skilled in the art, and are not redundantly described herein.

Preferably but not exclusively, the light-emitting element 16 is a light emitting diode. When the control program 12 is opened, the light-emitting element 16 is enabled to continuously emit a light beam or intermittently flicker. Consequently, the user can recognize whether the control program 12 is enabled.

In an embodiment, the first specified operation of opening the control program 12 is performed when the left button 113, the right button 114 and the intermediate button 115 are pressed simultaneously. Moreover, the second specified operation of closing the control program 12 is performed when the intermediate button 115 is pressed again. It is noted that the settings of the first specified operation and the second specified operation are not restricted. For example, according to the practical requirements, the settings of the first specified operation and the second specified operation are modified through the user operation interface 121. In the embodiment of FIG. 2, the light-emitting element 16 is an additional light source of the mouse device. In case that the mouse device is an optical mouse, the light-emitting element 16 is the original light source of the optical mouse for emitting a sensing light. After the sensing light is sensed by a sensing unit (not shown), the moving action of the optical mouse can be sensed by the sensing unit.

The operating principles of the input module 1 of the present invention will be illustrated in more details as follows. For example, if the user does not want the computer 2 to enter the hibernation mode because of the long idle time, the user may press the left button 113, the right button 114 and the intermediate button 115 of the input device 11' simultaneously. Consequently, the processing unit 111 of the input device 11' issues a control signal S13 to the computer 2. According to the control signal S13, the computer 2 executes the command of opening the control program 12. After the control program 12 is opened, the control program 12 detects whether the trajectory moving signal (i.e., the control signal S11) from the processing unit 111 of the input device 11' is received by the computer 2. If no trajectory moving signal has been transmitted from the processing unit 111 of the input device 11' to the computer 2 for a predetermined time period, the control program 12 issues a command signal S2 to the processing unit 111 of the input device 11'. After the command signal S2 is received by the processing unit 111 of the input device 11', the processing unit 111 of the input device 11' issues at least one response signal S3 to the computer 2.

In an embodiment, the at least one response signal S3 contains a first trajectory moving signal S31 and a second trajectory moving signal S32. The direction of the first trajectory moving signal S31 and the direction of the second trajectory moving signal S32 are opposed to each other. Moreover, after the first trajectory moving signal S31 has been issued for a specified time interval, the processing unit 111 of the input device 11' issues the second trajectory moving signal S32. After the first trajectory moving signal S31 is received by the computer 2, a command of moving the mouse cursor 21 in a direction D1 for one unit length is executed. After the second trajectory moving signal S32 is received by the computer 2, a command of moving the mouse cursor 21 in a direction D2 for one unit length is executed, wherein the direction D2 is opposed to the first direction D1. Consequently, the mouse cursor 21 is stayed at the original position. That is, even if the computer 2 has been idled for a long time after the control program 12 is opened, the movable distance of the mouse cursor 21 is not too large.

If the user wants to restore the computer 2 to the original settings of automatically entering the hibernation mode when the computer 2 has been idled for a long time, the user may press the intermediate button 115 of the input device 11'. Consequently, the processing unit 111 of the input device 11' issues a control signal S14 to the computer 2. According to the control signal S14, the computer 2 executes the command of closing the control program 12.

In the above embodiment, the input device 11' is the mouse device. In practice, the example of the input device 11' is not restricted. It is noted that numerous modifications and alterations may be made while retaining the teachings of the invention. For example, in another embodiment, the input device is a keyboard device.

From the above descriptions, the uses of the input device and the corresponding control program of the present invention allow the operation mode of the computer to be switched between the hibernation mode and the normal working mode in a humanized manner. Consequently, the input module of the present invention can comply with various practical requirements. For example, the input module 1 as shown in FIG. 2 is applied to a production line testing system. That is, the computer 2 in the production line testing system can be used to provide test commands to the device under test (not shown) and acquire the test results according to the feedback response of the device under test. In accordance with the conventional technology, the computer enters the hibernation mode if the test time is too long and thus the test procedure is interrupted. In accordance with the present invention, the test worker in the production line may firstly press the left button 113, the right button 114 and the intermediate button 115 of the input device 11' to open the control program 12 before the test procedure is started. After the test procedure is ended, the user may press the intermediate button 115 of the input device 11' to close the control program 12. Consequently, the input module of the present invention can achieve the power-saving purpose.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A method for preventing a computer from entering a hibernation mode, comprising:
   operating an input device by a user, wherein the input device is in communication with the computer and comprises a processing unit, wherein when the input device is operated by a user, the processing unit issues a control signal to the computer, so that the computer executes a command corresponding to the control signal; and
   running a control program installed in the computer, wherein if no control signal is issued to the computer by the processing unit for a predetermined time period after the control program is opened, the computer issues a command signal to the processing unit, wherein after the command signal is received by the processing unit, the processing unit issues at least one response signal to the computer so as to prevent the computer from entering a hibernation mode; wherein the at least one response signal contains a first trajectory moving signal and a second trajectory moving signal, wherein after the first trajectory moving signal has been issued for a specified time interval, the processing unit issues the second trajectory moving signal, wherein a direction corresponding to the first trajectory moving signal and a direction corresponding to the second trajectory moving signal are opposed to each other.

2. The method according to claim 1, wherein the input device is a mouse device, and the control signal is a trajectory moving signal.

3. The method according to claim 1, wherein the control program is opened in response to a first specified operation of the user, or the control program is closed in response to a second specified operation of the user.

4. The method according to claim 3, wherein the input device is a mouse device, and the mouse device comprises a scroll wheel, a left button, a right button and an intermediate button under the scroll wheel, wherein when the left button, the right button and the intermediate button are pressed simultaneously, the first specified operation is performed.

5. The method according to claim 3, wherein the first specified operation or the second specified operation is set by the user through the control program.

6. The method according to claim 1, wherein the input device further comprises a light-emitting element, wherein when the control program is opened, the light-emitting element is enabled.

7. The method according to claim 1, wherein the predetermined time period is set by the user through the control program.

8. The method according to claim 1, wherein the method is applied to a production line testing system.

* * * * *